United States Patent [19]

Mori

[11] 4,121,928
[45] Oct. 24, 1978

[54] METHOD FOR THE MANUFACTURE OF MULTI-LAYER SLIDING MATERIAL

[75] Inventor: Sanae Mori, Nagoya, Japan

[73] Assignee: Daido Metal Company Ltd., Nagoya, Japan

[21] Appl. No.: 704,034

[22] Filed: Jul. 9, 1976

[30] Foreign Application Priority Data

Aug. 8, 1975 [JP] Japan .................................. 50-96325

[51] Int. Cl.$^2$ ............................................. B21D 53/10
[52] U.S. Cl. ........................... 75/208 CS; 29/149.5 R; 29/149.5 PM; 29/149.5 S
[58] Field of Search ................. 29/149.5 R, 149.5 CS, 29/149.5 PM; 75/208 CS

[56] References Cited

U.S. PATENT DOCUMENTS

| | | | |
|---|---|---|---|
| 2,339,208 | 1/1944 | van der Pyl | 75/208 CS |
| 3,104,135 | 9/1963 | Morrison et al. | 308/237 |
| 3,755,090 | 8/1973 | Jackson et al. | 75/208 CS |
| 3,797,084 | 3/1974 | Fedor | 29/149.5 PM |
| 3,812,563 | 5/1974 | Toaz | 29/149.5 PM |
| 3,884,729 | 5/1975 | Jackson et al. | 75/208 CS |

FOREIGN PATENT DOCUMENTS 9,056/64 5/1964 Japan.
20,330/64 9/1964 Japan.

*Primary Examiner*—Brooks H. Hunt
*Attorney, Agent, or Firm*—Karl W. Flocks

[57] ABSTRACT

This invention discloses a method for manufacturing a multi-layer sliding material, said method substantially comprising laying and distributing metal powder which contains aluminum as a main component thereof, uniformly on a steel plate or a steel plated with Ni or the like in the form of a multi-layer composite metal plate, cold rolling the metal powder loaded plate and then sintering the same into a sufficiently bonded composite material. In accordance with the present invention, there is provided a multi-layer sliding material which has high adhesion between the steel plate and the sintered metal powder, is excellent in fatigue resistance and is satisfactory in surface properties as well as a method for manufacturing said multi-layer sliding material in a simple and inexpensive manner.

12 Claims, 7 Drawing Figures

METHOD FOR THE MANUFACTURE OF MULTI-LAYER SLIDING MATERIAL

The present invention relates to a multi-layer sliding material and method for manufacturing the same, and more particularly to a composite material for bearings and method for manufacturing the same using a powder metallurgy technique.

To facilitate precise understanding of the present invention, it will be convenient to start first with description of hitherto known prior art, since this invention lies in a variety of improvements of the conventional composite materials for bearings and the methods for manufacturing them.

As to the hitherto known composite materials for bearings and methods for manufacturing them in a powder metallurgy technique, the following are disclosed in the published patent specifications;

(1) Japanese patent publication Nos. 21122/65, 45445/74, 9056/64, 20330/64, U.S. Pat. Nos. 2815567 and 3094415.

In the above patented inventions of Japanese patent publication No. 21122/65, 45445/74, however, the following drawbacks are observed;

(a) During metal-powder rolling, cracking takes place around the end or edge of the powder loaded plate, resulting in a reduced yield rate of the final products.

(b) Due to the technique employed, in which two or three layers are formed during the process of rolling powders, such a problem as thickness control of the layer of powder to be supplied is often encountered. This technique is, therefore, more complicated in respect of manufacturing process and requires a higher manufacturing cost than that of the method of laying and distributing metal powder directly on a steel plate.

(c) When an alloy plate is rolled together with a steel plate to be bonded therewith, it fails to be bonded with the steel plate, unless it is elongated by more than 40% of the original length. If a powder of soft metal such as lead or the like is employed, it stretches out like a yarn without being bonded with the steel plate. Therefore, the products manufactured in this way are liable to be object to fatigue due to stress concentration when they are put in practical use. With respect to the techniques disclosed in the last four patents mentioned above the following drawbacks are recognized;

(d) Because metal powder is distributed in a single layer and is rolled at an elevated temperature, soft metal such as lead or the like tends to be deposited in the boundary adjacent to the steel plate, causing adhesiveness to be reduced.

(e) Powder of soft metal e.g. lead extends similar to yarn during rolling at an elevated temperature. The products manufactured according to this technique tend to fatigue easily due to stress concentration.

(f) As it is required to heat the raw material to an elevated temperature while maintaining it still in a powder state, the material should be maintained in an non oxidizing or reducing atmosphere so that no oxidation takes place. This makes the manufacturing process complicated and expensive.

In view of the above drawbacks inherent to the hitherto known techniques, the present invention proposes a multi-layer sliding material and method for manufacturing the same, which is adapted to be completely free from such drawbacks.

An object of the present invention, therefore, is to provide a multi-layer sliding material which has very high adhesion between a steel backing plate and layers of metal powder, and method for manufacturing said sliding material.

Another object of the present invention is to provide a multi-layer sliding material which has high fatigue strength and the method for manufacturing said sliding material.

Another object of the present invention is to provide a multi-layer slidibg material which may be economically manufactured using a simplified manufacturing equipment, and a method for manufacturing said sliding material.

Still another object of the present invention is to provide multi-layer sliding material which is excellent in respect of yield rate, and method for manufacturing said sliding material.

Further another object of the present invention is to provide multi-layer sliding material which has both high fatigue strength and excellent surface characteristics, and method for manufacturing said sliding material.

Now the advantages of the present invention are described as follows;

(1) Very high bonding strength is obtainable, because metal powder having good adhesion to steel plate is employed for the first layer (boundary or intermediate layer).

(2) Placing of metal powder and initial rolling is carried out at a lower temperature. No process is involved for rolling a wrought alloy plate so as to bond it to steel plate. Accordingly, powdered metal of low melting temperature such as lead or the like extends by no means like yarn, but lies scattered as elongate grains having some thickness throughout the rolled surface, so that excellent fatigue strength is expected for practical use.

(3) Because no specific process for manufacturing rolled metal powder plate is involved and, moreover, no heating to a range of elevated temperature is required for rolling metal powder to be bonded to steel plate, it is unnecessary to provide complicated and expensive instruments and equipment for control of the atmosphere as well as for the production line. This results in reduced manufacturing cost.

(4) As no malfunction such as end or edge cracking during powder-rolling occurs, high yield rate of final products is expected.

(5) The closer to the sliding surface of the product, the more lubricating additive is contained therein. This enables the product to have both excellent strength and surface properties.

Now the present invention will be more readily understood by referring to the accompanying drawings, in which.

It is to be noted that same numerals on the above drawings denote same or corresponding parts or portions.

Now the present invention will be described in detail on an embodiment thereof with reference to the accompanying drawings.

Figure 1:
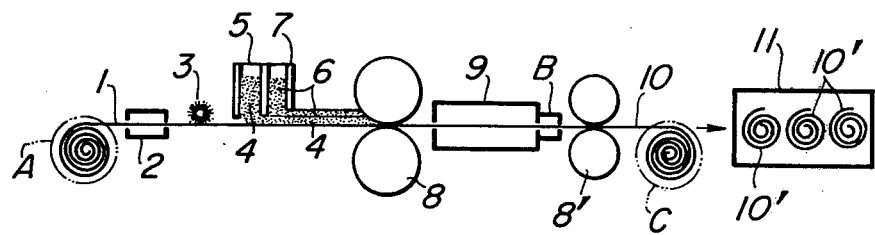
FIG. 1 is a schematical illustration of a manufacturing line wherein an embodiment of the present invention is practised.

In FIG. 1 is shown a schematic layout for practising a method for manufacturing multi-layer sliding material according to the present invention. On uncoiler A (supply source of steel plate) is provided a strip of steel plate 1 in the form of a coil. The chemical composition of the steel plate is equal to that of ordinary low carbon steel (e.g. SPCE according to JIS G-3141). The steel strip 1 is uncoiled by passing it through a degreasing chamber 2, using a cleaning agent such as trichroloethylene so that dirty materials on the steel strip are removed therefrom. The steel strip 1 then reaches wire brush 3 so that the surface thereof to be bonded is brushed by the brush. After this preparatory work on the steel strip 1 is completed, metal powder for forming the first layer (boundary or intermediate layer) as specified in Table 1 which will be explained later is laid and distributed on said steel strip 1 through first hopper 5. And then on the first layer powder metal for the secondary layer (alloy layer) is distributed through second hopper 7, the chemical composition of said metal powder being as specified in Table 2, which will also be explained later. Depending on the intended use of the optimum thickness or amount of powder to be distributed for each of layers is selected such that the first layer (boundary layer) is as thick as 0.01 to 0.25 mm in the state of the final bimetal product, while the secondary layer (alloy layer) is 0.15 to 1.5 mm. When the distribution of the metal powder in the above way is completed, the steel strip 1 is fed between the gap of the rolls of rolling mill 8, and then the metal powder loaded steel strip 1 is subjected to rolling-down, until the average density of the distributed metal powder reaches more than 90% of the theoritical density of the metal powder concerned. It is recognized at this moment that the surface of the secondary layer displays a metallic colour. The rolled and bonded material is adapted to enter into sintering furnace 9 so that it is sintered during passing through said furnace. In this process of sintering, three different kinds of atomosphere, that is, cracking gas of $NH_3$, $N_2$ gas and normal air were employed for the experiments, but they did not make any significant difference among each other particularly in respect of physical properties of product. Finally it was found that the suitable sintering temperature for the said material is preferably between 350° to 450° C., as far as the chemical compositions as specified in Table 1 and 2 are employed, although said suitable temperature may vary to some extents, depending on the chemical compositions of the material to be sintered.

It is obvious that the period of sintering time varies, depending on capacity of the sintering furnace, volume of material charged therein and so on. Generally speaking, sintering is completed in a short period of time in the case of sintering at an elevated temperature. When sintering is carried out in a short period of time and at lower temperature, the extent of sintering is insufficient. On the other hand, if sintering is effected for a long period of time at high temperature, sintered powder becomes more metallic, but it follows that a brittle intermetallic compound or compounds grows between the sintered layer and the steel strip 1 and further, metal of low melting temperature may partially melt on the surface of sintered strip. It is required, therefore, that sintering is effected in properly selected conditions which are to be determined by taking the above points into consideration.

Then, the thus sintered steel strip 1 passes through cooling zone B to be further transfered to rolling mill 8', in which said steel strip 1 is finish-rolled between the rolls of said mill 8' to a predetermined thickness. The extent of cold reduction of said rolling mill 8' is adequately selected in accordance with the kind of steel strip to be rolled. When an excessively high reduction rate is employed, work hardening of the steel plate takes place remarkably, thereby causing all subsequent working steps to be carried out only with difficulty, so care should be taken of this point.

As the material tends to bend towards the steel plate side when subjected to the afore-mentioned rerolling mill 8', a set of straightening guide rolls (not shown here) is installed at an outlet of the rolling mill 8'. Now three layer bearing material 10 which is finish-worked through said guide roll is coiled up on coiler C. Then the coiled three layer bearing material 10 is annealed in an annealing furnace 11 at 370° C. for 4 hours, so that tri-metal 10' is obtained. With respect to the annealing condition, however, a variety of experiments show that it has little effect on the physical properties of the products.

The above embodiment of the present invention has been described in a definite and restrictive way, but it will be readily understood that the invention should not be limited to such definite embodiment. In this connection, the aspects to be taken into account will be pointed out as follows;

(1) In the above embodiment of the present invention, a strip of steel 1 Japanese Industrial Standard specification JIS G-3141 is employed. But it goes without saying that the above steel of SPCE need not be used, but a strip as well as a cut sheet of an other type such as stainless steel, high tensile steel etc. is also available. Moreover the steel strip 1 may be plated with Ni or Co, as explained later.

(2) In the degreasing chamber (cleaning chamber) 2, vapour of trichloroethylene is applied, but any other suitable solvent may be used for surface cleaning.

(3) As tools for brushing the surface of the steel plate to be bonded, wire brushes are employed for the above embodiment. But other means e.g. burnishing, shot blasting and the like may be used for the brushing process.

(4) Cleaning in the degreasing chamber and/or grinding by means of wire brushing may be carried out previously in a separate operation. Moreover either of the degreasing chamber and wire brush may be eliminated. For instance, steel strip 1 or steel plate just having been nickel-plated may be exempted from cleaning work in the degreasing chamber.

(5) As to the chemical composition for the first layer (boundary layer), pure aluminum will be the most preferable one in view of the optimum adhesiveness to steel plate. From the standpoint of improvement of strength, however, it is preferable to add other element(s) such as Cu, Ni, Si, Mg, Zn etc..

(6) As an additive to the first layer, solid lubricant such as metal sulfide, an intermetallic compound, metal oxide, metal fluoride, graphite, nitrified boron, P.T.F.E. (polytetrafluoroethylene), fluoridized graphite, carbon fibre etc. and a lubricant of metal powder of low melting temperature such as Sn, Pb, Bi, Cd, Sb, Te, Ti, In etc. are applied (the amount of addition for each layer is explained later).

(7) At the rolling mill 8, cold rolling is conducted at a lower temperature, but by this cold rolling is meant any rolling work to be conducted in a temperature range from room temperature to the recrystallization temperature of aluminum, that is, at the highest 260° C. Normally rolling is carried out at room temperature, but if there is difficulty of metallizing, a higher temperature upto 260° C. is applied during rolling. It can be noted, however, that this way of rolling allows soft metal e.g. lead and the like to readily elongate (this by no means damages the usability of the material) and on the other hand, promotes slow oxidation of the material to some extent. This requires some consideration, for instance, for the rolling work to be carried out in a controlled atmosphere.

(8) If the reduction ratio of rolling mill 8 is such that the rolled material has a density of less than 90% of the theroretical density of the distributed metal powder, the material will fail to accept a metallic alloy layer, even if it is sintered in the sintering furnace 9. This is because the film of aluminum oxide has not been satisfactorily broken down during rolling operation.

(9) It is specified that sintering shall be conducted in the sintering furnace 9 at a temperature range of 280° to 520° C. Reason is described as follows; When sintering is done at a temperature lower than 280° C., diffusion fails to progress, resulting in the weak bonding of individual grains of metal powder. Even if metal powder having good diffusion characteristic is specially selected, it still requires an excessively long time for sintering at such a lower-temperature and therefore, inconvinient in practical use. In the meantime, if sintering is effected at a temperature higher than 520° C., positive activation takes place thereby causing the steel plate or layer of plated material to react with the metal powder to form an intermetallic compound therebetween. This should of course be considered in view of the co-relation with the length of time for sintering. By way of example of a steel plate without a plating layer, a brittle compound such as $Fe_2Al_5$ is produced by sintering for one hour of actual heating time and at a temperature higher than 460° C., so that the bonding power is substantially reduced. Further, taking a Ni plated steel plate as another example, it is found that 1 hour's sintering above 460° C. does not result in any appreciable formation or growth of a brittle compound, provided that the sintering temperature is kept lower than 520° C.

(10) With respect to the atmosphere in the sintering furnace 9, air may be used, if the alloy selection is made so that sintering is completed at a lower temperature. But when sintering at an elevated temperature is required, it is preferable to use a non-oxidizing gas atmosphere or reducing gas atmosphere. As to heating means, any suitable type of gas heating, electrical resistive heating, or high frequency induction heatings may be freely selected in consideration of the location of the installation, economic conditions etc.. In some case preheating at a temperature lower than 280° C. is required, because excessively quick heating may cause the material to swell, thus resulting in possible rejection of the sintered material.

(11) Normally the sintering furnace is provided with a cooling zone B. An embodiment without such a cooling zone B, however, is also possible, wherein lining material is transferred at a temperature higher than room temperature and then hot-rolled at the rolling mill 8' in view of the equipment installation and layout thereof. Particularly in the case of an alloy which is difficult to metallize hot-rolling will be preferable.

(12) The sintering furnace 9 need not be a continuous type one as illustrated in the accompanying drawing, but may be of batch type. Moreover another arrangement can be such that material passes through a continuous furnace, and thereafter is coiled and then sintered in a sintering furnace of a batch type.

(13) Further the rolling mill 8' is provided so as to make the sintered material denser and to have predetermined dimensions. If it is principally intended to accurately assure required dimensions, cold rolling is preferable, but the material may be hot rolled when the main purpose is to make it denser.

(14) Usually a two stage mill is employed for the rolling mill 8 and 8'. If higher quality products are required, a multi-stage mill is more satisfactory. To improve further the density of the material, the diameter of the upper roll of the mill 8, 8' may be smaller than that of the lower roll thereof, or the rotation speed of the upper roll may be slower than that of the lower roll, or the upper roll may be constructed so as not to be driven.

(15) Coiler C is used to wind the multi-layer material in the form of a coil after the rolling thereof. In the case of smaller diameter coiler, it will be recommendable to wind the material in the opposite direction to that illustrated in FIG. 1, and it can be expected to have little injurous effect on the surface of the alloy.

(16) Annealing furnace 11 is installed for relieving the stresses in the work-hardened aluminum alloy layer of the multi-layer material 10 which has been brought about by the preceding step, and for stabilizing the hardness of the material as well as for adhesion to the steel plate. Usually the furnace 11 is operated in a temperature range of 280° to 520° C., although the working temperature of the furnace 11 varies in dependence on the alloy elements of the material, type of steel plate (e.g. Ni-plated or not) and the intended use of the final products. In FIG. 1 the annealing furnace 11 illustrated is of a batch type, but it may be of course of a continuous type construction. The atmosphere in the annealing furnace may be air, a non-oxidizing or reducing atmosphere. It can be properly selected according to the conditions of material to be annealed and temperature to be applied.

(17) Working steps of the rolling mill 8' and the annealing furnace 11 may be eliminated, depending on the prospective or intended application of the final products. On the other hand, the working steps of rolling and subsequent annealing may be repeated many times, so that a denser structure and predetermined dimensions of the material may be correctly assured. In this connection, it has been found by the inventor through his experiments that if the total sum of the reduction ratio of the backing material exceeds 55% in case of repeated rolling work, a remarkable work-hardening is observed, and as a result, rendering any subsequent work considerably difficulty. Therefore, the total reduction ratio of the backing material should be always kept lower than 55%.

Next, the multi-layer sliding material as manufactured by the above mentioned-method according to the present invention, particularly its structure and also supplementary considerations to be paid in the course of manufacture will be described in the following with reference to FIGS. 2 to 6.

Figure 5:
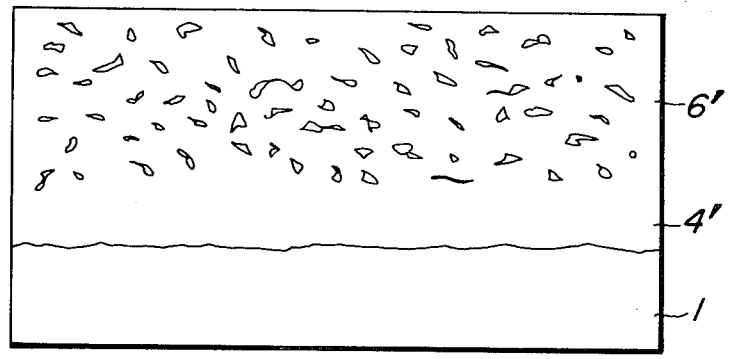
FIG. 5 and 6 are microstructure of the material of this invention, respectively, both of which show the structure of a cross section taken parallel to the lengthwise direction of the strip.
Figure 6:
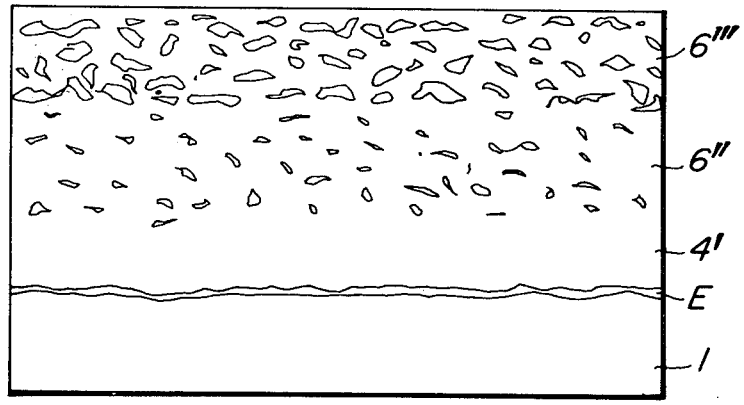

FIGS. 5 and 6 are sectional illustrations of the structure of a strip of multi-layer sliding material according to the present invention sectioned in the longitudinal direction. As seen in FIG. 5, numeral 1 denotes a steel plate, and as mentioned above, low carbon steel is usually used for the steel backing plate 1, but plate of special steel such as stainless steel, high tensile strength steel etc. may also be used. Numeral 4' denotes a first layer (boundary layer), which comprizes aluminum as a main component, and said aluminum neither contains solid lubricant nor any additive lubricant of metal powder of low melting point or may contain them but only in less amounts than that contained in alloy layer 6' (second layer). Further additional elements such as Cu, Ni, Si, Mg, Zn etc., any of which contribute to improvement of the physical properties of aluminum can be added to the aluminum layer by 0.1 to 15 weight percent in total of the whole alloy layer.

These additive elements fail to act effectively if they are added only by less than 0.1 weight percent. If the addition exceeds 15 weight percent, however the material becomes too brittle to be put in to practical use. Thus, when the elements are to be added, addition should be kept within 0.1 to 15 weight percent of the whole alloy layer at any time. 6' denotes a second layer (alloy layer), which contains one or more of said solid lubricants and lubricants of a metal powder of low melting point in total by 2 to 40 weight percent of the whole alloy layer, matrix of the alloy layer of aluminum also may contain one or more elements mentioned above such as Cu, Ni, Si, Mg, Zn etc., any of which improves the physical properties of aluminum, by 0.1 to 15 weight percent of the whole alloy layer.

Now it is to be noted here in connection with aforesaid item (6), that said metal sulphide refers to $MoS_2$, PbS and so forth said intermetallic compounds are referred to $MoSe_2$, $WTe_2$, $Mn_5Si_3$, said metal oxides refer to PbO, $Pb_3O_4$, $TiO_2$, CdO and so forth, and said metal fluorides are $CdF_2$, $BaF_2$, $PbF_2$ and so forth. Further as material which serve to act as a solid lubricant, talc, mica, iodide, bromide, plastics, metallic soap, glass fibre etc. can be typically used.

The maximum content of lubricant in the second layer 6' should be specified to be 40%, because the mechanical properties of the alloy layer become too deteriorated to be applied for practical use, if the content of lubricant in said layer 6' exceeds 40%. On the other hand, the lower limit thereof should be 2%, because the actual effect owing to lubricant addition fails to be completely attainable if the lubricant content is less than 2%.

It should be noted that a component to be added to said second layer 6' (alloy layer) can be used in the form of a prealloyed metal powder to be sintered. The components that may be available in the form of prealloyed powder vary in dependence on the chemical compositions of the intended alloy, intended structure and place of application as final products. It will be obvious that metal which cannot be alloyed should be used in the form of a powder state mixture.

Referring to FIG. 6, it is a modified embodiment of the multi-layer sliding material as shown in FIG. 5, wherein E denotes a layer plated with Ni. Beside Ni the layer may be plated with Co, Co-P, Ag etc.. Such plating is applied, where the component employed in the first layer 4' is not able to form stable bonding to the steel plate or it is intended to be sintered at a considerably high temperature. For instance, a brittle intermetallic compound such as $Fe_2Al_5$ is formed, when sintering is performed without a plated layer at 460° C., on the other hand it is recognized that $NiAl_3$ does not develope to an appreciable extent even sintering is conducted at higher temperature when the material is plated with Ni. But, if sintering is carried out at a temperature in excess of 520° C., a brittle intermetallic compound developes very actively, causing extremely high reduction of adhesiveness. Numerals 6" and 6"' are both alloy layers, and such alloy layers which are composed of two layers are produced to meet requirements for better bedding-in performance and proof against hot adhesion.

Greater amounts of solid lubricant and metal lubricant of low melting temperature are contained in the alloy layer 6"' than those contained in the alloy layer 6". Accordingly, it is appreciated that the material is constructed such that the alloy layer 6" carries the load, while the alloy layer 6"' is responsible for the initial bedding in period and proof against hot adhesion. It should be noted, however, that the total amount of solid lubricant and lubricant of metal powder of low melting point to be added to the alloy layer 6"' should be also specified to be within 2 to 40 weight percent in this case also.

The structure of the multi-layer sliding material according to the present invention need not be limited only to that as illustrated in FIGS. 5 and 6. It may comprize e.g. a combination of 1 - 4' - 6" - 6"' or 1 - E - 4' - 6'.

In Table 1 is shown typical composition for the first layer 4' (boundary layer), while in Table 2 is shown that for the secondary layer 6' (6", 6"').

Table 1

| No. | Cu | Si | Al |
|---|---|---|---|
| | | | (in weight percent) |
| 1 | — | — | 100 |
| 2 | 1 | — | Bal. |
| 3 | 4 | — | Bal. |
| 4 | — | 5 | Bal. |
| 5 | 0.8 | 3 | Bal. |

Table 2

| No. | Pb | Sn | Cu | Si | Others | | Al |
|---|---|---|---|---|---|---|---|
| | | | | | (in weight percent) | | |
| 1 | 8 | 0.5 | 1.0 | — | | | Bal. |
| 2 | 12 | 0.8 | 0.8 | 3 | | | Bal. |
| 3 | 12 | 1.1 | 0.8 | 8 | | | Bal. |
| 4 | 12 | 0.8 | 0.8 | — | graphite 2%, steel is plated with Ni | | Bal. |
| 5 | 12 | 0.8 | 0.8 | — | carbon fibre 2%, steel is plated with Ni | | Bal. |
| 6 | 12 | 0.8 | 0.8 | — | $Mn_5Si_3$ | 2 | Bal. |
| 7 | 12 | 0.8 | 0.8 | — | P.T.F.E. | 2 | Bal. |
| 8 | 12 | 0.8 | 0.8 | 3 | PbO | 6 | Bal. |
| 9 | 12 | 0.8 | 0.8 | — | Sb | 4 | Bal. |
| 10 | 18 | 1.2 | 0.8 | — | | | Bal. |
| 11 | 23 | 1.5 | 0.8 | 3 | | | Bal. |
| 12 | 35 | 2.2 | — | — | | | Bal. |
| 13 | — | 1.0 | 0.8 | 3 | PbO | 20 | Bal. |
| 14 | — | — | 0.8 | — | PbO | 35 | Bal. |

Almost all of the specimens as listed in Table 1 and 2 are produced, using blended metal powder by mixing single ingredient elements, but some of them are of prealloyed metal powder. All those shown in Table 1 and 2 represent merely typical embodiments of the present invention, and the chemical compositions for the first and second layers of course should not be limited to those specified in Table 1 and 2.

The reason why Pb is mostly employed for metal powder of a low melting point lies in the fact that Pb itself is superior to other metals in respect of proof against high temperature adhesion and that it is inexpensive, as compared with the cost of other metals e.g. Sn, Bi, Cd etc.. Besides, Sn is used for the purpose of the improvement of proof against corrosion and Cu is for increasing strength of the aluminum matrix. But these elements may be replaced with others such as Ni, Mn, Mg, Zn etc.. With respect to the alloy layer of the multi-layer material with two layers 6" and 6'" illustrated in FIG. 6, another embodiment of the present invention was that the alloy layer 6" is composed of 10% of Pb and the balance being Al, while the alloy layer 6'" is of 30% of Pb and the balance being Al.

Figure 2:
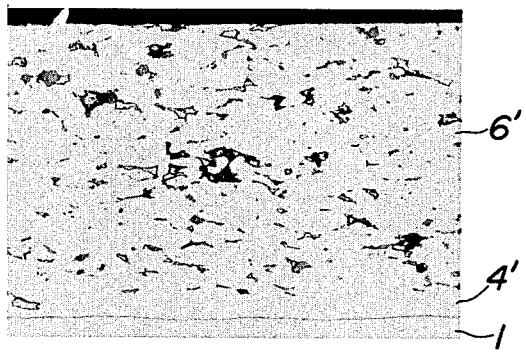
FIG. 2 to 4 are photomicrographs of the embodyment of the material according to the present invention, all of which are taken as sectioned in the rolling direction in 100 magnification.
Figure 3:
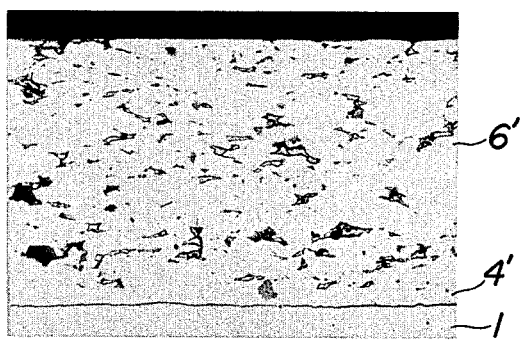
Figure 4:
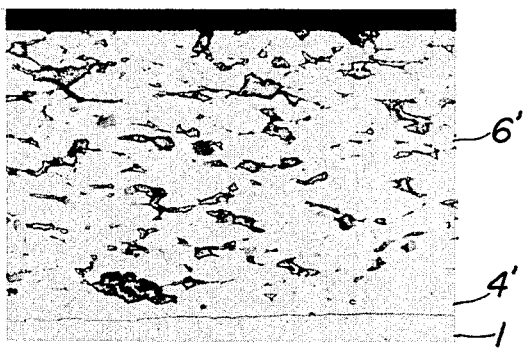

Referring to FIGS. 2, 3 and 4, each of them shows microscopic structure of specimen of the multi-layer sliding material, an embodiment of the present invention, taken in 100 magnification. More particularly, they are a structure on sectional plane taken parallel to the direction of rolling. The specimens are composed as follows;

|  | 1 | 4' | 6' |
|---|---|---|---|
| specimen as shown in FIG. 2 | steel plate (JIS, G3141, SPCE) | Al-0.8 Cu | Al-12 Pb-0.8 Sn -0.8Cu-3Si-6PbO |
| that as shown in FIG. 3 | same as the above | same as the above | Al-23Pb-1.5Sn -0.8Cu-3Si |
| that as shown in FIG. 4 | " | " | Al-20PbO-1Sn -0.8Cu-3Si |

As seen in the microphotographs the structure of FIGS. 2 to 4, the grey-coloured square crystals represent Si. Pb and PbO can be reasonably distinguished from each other, as the latter appear darker than the former. The boundary area between the first layer 4' (boundary layer) and the secondary layer 6' (alloy layer) is not clearly identified, because both layers are constructed by specific metal powder distributed thereon and positional interchange of particles in the metal powder for both layers takes place to some extent particularly in the neighbourhood of said boundary. As a reference, mechanical properties of the specimens from the above mentioned embodiments are shown in Table 3.

Table 3

|  | hardness of alloy Hv(S) | tensile strength of alloy Kg/mm² | shear strength of bonding Kg/mm² |
|---|---|---|---|
| specimen as shown in FIG. 2 | 42 | 11.3 | 7.2 |
| specimen as shown in FIG. 3 | 36 | 9.8 | 6.8 |
| specimen as shown in FIG. 4 | 43 | 11.5 | 7.0 |

As can be easily recognized from a comparison between the material according to this invention and that of the prior art as disclosed, for instance, in the specification of Japanese patent publication No. 9056/64 the adhesive strength of the former is superior to that of the latter.

Figure 7:
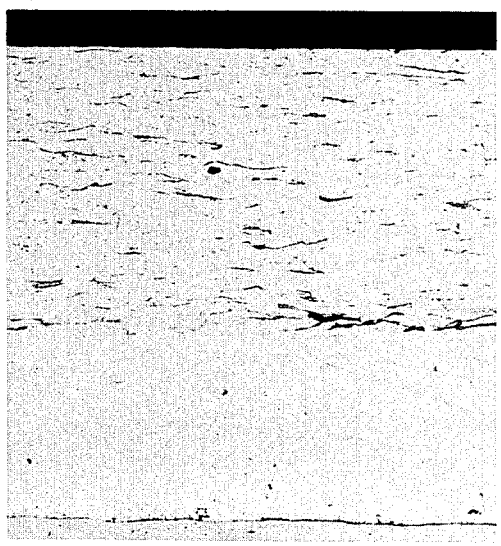
FIG. 7 is a photomicrograph of a conventional material manufactured in accordance with a conventional method, taken in the rolling direction and in 100 magnification.

The microphotograph shown in FIG. 7 is that of the microstructure of the sliding material manufactured in accordance with the method disclosed in the specification of Japanese patent publication No. 21122/65, said material having the chemical composition of the No. 10 specimen listed in Table 2. The photo was taken in 100 magnification on the sectional plane parallel to the direction of rolling. It is seen in the photo that the component of metal of low melting point is extended like yarn. On the contrary to the material of the prior art, the material according to this invention has no fibrous extension of the component of low melting point, but a great many grains of elongated sharp-pointed shape scattered unformly in the matrix as shown in FIGS. 2 to 4. It will be well realized, therefore, that the material according to this invention displays higher fatigue resistance than that of the prior art.

The material manufactured by means of the method according to the present invention is applicable to a variety of applications e.g. bearings, bushes, shoes, sliding plates and the like, as well as a frictional material and a sliding member for an electric collector.

As described above with reference to the accompanying drawings, the present invention applied for patent is very useful and economically practicable in many fields of industry.

What is claimed is:

1. A method of manufacturing multi-layer sliding material, which comprises following the steps in the sequence set forth:
   (a) preparing a surface of a steel plate to make said surface suitable for adhering a coating;
   (b) preparing two kinds of powder mixtures, one for a first, boundary layer and the other for a second, alloy layer, the first powder mixture consisting of aluminum alone or aluminum with at least one powder additive selected from the group consisting of strengthening elements, solid lubricants and lubricants of metal powder of low melting point; the second powder mixture consisting of aluminum powder as a main component and 2 to 40 percent by weight of at least one powder additive selected from the group consisting of metal powder lubricants of low melting point, solid lubricants and strengthening elements, the amount of additives being adjusted to have more weight percent than that added to the first powder mixture;
   (c) laying and distributing by gravity said first powder mixture as a first layer on the surface of said steel plate;
   (d) laying and distributing by gravity the second powder mixture as a second layer on said steel plate over said first layer;
   (e) passing the steel plate and two layers of powder mixtures loosely laid thereon together through a cold rolling mill and rolling down the metal powder loaded steel plate at room temperature so as to compact it until the average density of the distributed metal powder mixture reaches at least 90% of the theoretical density of said metal powder and to bond said powder mixture to said steel plate;
   (f) and sintering the rolled and compacted steel plate and powder mixtures at a temperature range of from 280° to 520° C.

2. A method of manufacturing multi-layer sliding material as claimed in claim 1, wherein a third powder mixture for an additional alloy layer consisting of pure aluminum powder with additives of more amount than that of the first layer but less than that of the second layer is prepared, laid and interposed by gravity between the first layer and the second layer, prior to said rolling down operation.

3. A method of manufacturing multi-layer sliding material as claimed in claim 1 wherein said lubricant of metal powder of low melting point is selected from the group consisting of Pb, Sn, Bi, Cd, Sb, Te, Tl, In or mixtures thereof; said solid lubricant is selected from the group consisting of metal sulphides, metal oxides, metal fluorides, graphite, intermetallic compounds, nitrified boron, P.T.F.E., fluoridized graphite, carbon fiber and mixtures thereof; and said strengthening element is selected from the group consisting of Cu, Ni, Si, Mg, Zn and mixtures thereof.

4. A method of manufacturing multi-layer sliding material as claimed in claim 1, wherein the steel plate is plated with nickel, cobalt, Co-P and Ag.

5. A method of manufacturing multi-layer sliding material as claimed in claim 1, wherein the preparation of said steel plate comprises cleaning said plate using a degreasing chamber filled with vapour of trichloroethylene.

6. A method of manufacturing multi-layer sliding material as set forth in claim 1, wherein the preparation of said steel plate comprises roughing said plate using wire brushes.

7. A method of manufacturing multi-layer sliding material as claimed in claim 1, wherein said sintering step is conducted in a non-oxidizing or a reducing atmosphere.

8. A method of manufacturing multi-layer sliding material as claimed in claim 1 which further comprises the steps of cold-rolling or hot-rolling the material which has been subjected to all of the steps so as to make the finished sliding material more dense and to form it to predetermined dimensions and then annealing said material at a temperature ranging from 280° to 520° C.

9. A method of manufacturing multi-layer sliding material as claimed in claim 8, wherein said step of rolling for making the material more dense and forming it to predetermined dimensions is conducted using a multi-stage rolling mill.

10. A method of manufacturing multi-layer sliding material as claimed in claim 8, wherein the total amount of reduction ratio for the steel plate through repeated steps of rolling for making the material more dense and forming it to predetermined dimensions is maintained less than 55%.

11. A method of manufacturing multi-layer sliding material as claimed in claim 3, wherein said metal sulphide is selected from the group consisting of $MoS_2$ and PbS, said intermetallic compound is selected from the group consisting of $MoSe_2$, $WTe_2$ and $Mn_5Si_3$, and said metal oxide is selected from the group consisting of PbO, $Pb_3O_4$, $TiO_2$ and CdO, and said metal fluoride is selected from the group consisting of $CdF_2$, $BaF_2$ and $PbF_2$.

12. A method of manufacturing multi-layer sliding material as claimed in claim 3, wherein said solid lubricant is selected from the group consisting of talc, mica, iodide, chloride, bromide, plastics, metallic soap, glass fiber and mixtures thereof.

* * * * *